Jan. 9, 1968 KAZUO WATANABE 3,363,145

CONSTRUCTION OF DEFLECTION AND HIGH VOLTAGE
SYSTEM FOR TELEVISION RECEIVER
Filed Oct. 12, 1966

INVENTOR
KAZUO WATANABE

BY *Darby & Darby*

ATTORNEYS

United States Patent Office 3,363,145
Patented Jan. 9, 1968

3,363,145

CONSTRUCTION OF DEFLECTION AND HIGH VOLTAGE SYSTEM FOR TELEVISION RECEIVER

Kazuo Watanabe, Osaka, Japan, assignor to Sanyo Electric Co. Ltd., Moriguchi-shi, Japan, a corporation of Japan Filed Oct. 12, 1966, Ser. No. 586,280
Claims priority, application Japan, Nov. 12, 1965, 40/92,107
9 Claims. (Cl. 317—100)

ABSTRACT OF THE DISCLOSURE

A deflection and high voltage sub-assembly for a television receiver chassis in which a base plate holding the rectifier is mounted on the transformer and an electrical connector is located on the base plate to mate with another electrical connector mounted on the receiver chassis to make the sub-assembly readily detachable from the chassis. The sub-assembly also includes a plate for enclosing the back of a protective housing, the plate serving as a heat sink.

This invention relates to the mounting of electrical components and more particularly to the construction of an assembly for portions of the deflection and high voltage systems of a television receiver which is readily removable from the receiver chassis.

In the construction of conventional television receivers, the high voltage transformer and other components associated with it e.g., tubes or transistors, resistors, capacitors, etc., are generally located in a protective housing on the television chassis and are mounted either to the housing or the chassis by suitable fastening members such as rivets, screws and the like. While such mounting arrangements hold the components satisfactorily, their use entails many manual operations in both assembling the high voltage and deflection unit and also when servicing it.

In accordance with the present invention, a novel construction is provided for portions of the horizontal deflection and high voltage systems of a television receiver, in which the high voltage transformer and other components are mounted on a separate assembly which can be readily mounted to or removed from the chassis of the receiver. The assembly has an electrical connector for electrically connecting the mounted components to other electrical circuits of the chassis. In a preferred embodiment of the invention, the connector is also mounted in a manner to cool the housing within which the assembly is located. Also, an embodiment of the invention is disclosed wherein the assembly has a means for holding a transistor, which means also serves as a heat sink.

It is therefore an object of the present invention to provide a removable assembly for portions of the deflection and high voltage systems of a television receiver which permits speedy assembly and servicing of the receiver.

A further object is to provide a high voltage transformer assembly which is easily removable from a television chassis.

A further object is to provide a readily removable high voltage transformer and deflection assembly, a portion of which can be used as a heat sink for one or more power transistors which cooperate with other components of the receiver some of which may be on the assembly.

Other objects and advantages of the present invention will become more apparent on reference to the following specification and annexed drawings in which.

Figure 1:
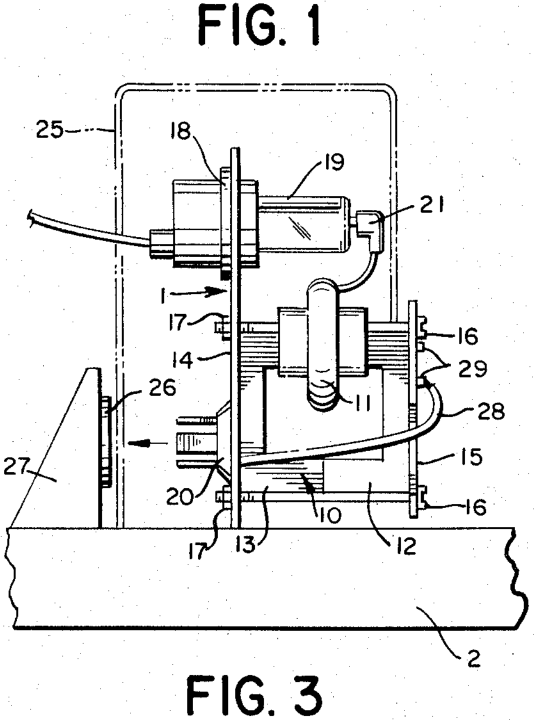
FIG. 1 is a side-elevational view showing an assembly for mounting on a television receiver chassis in accordance with one embodiment of the invention.

Referring to FIG. 1, the transformer assembly 1, which is to be mounted on and used in conjunction with the electrical circuits (not shown) contained in the chassis 2 of a television receiver, includes the usual transformer 10 for the horizontal deflection and high voltage systems of the television receiver. Transformer 10 has a coil 11 placed over one leg of a core formed by portions 12 and 13.

Figure 2:
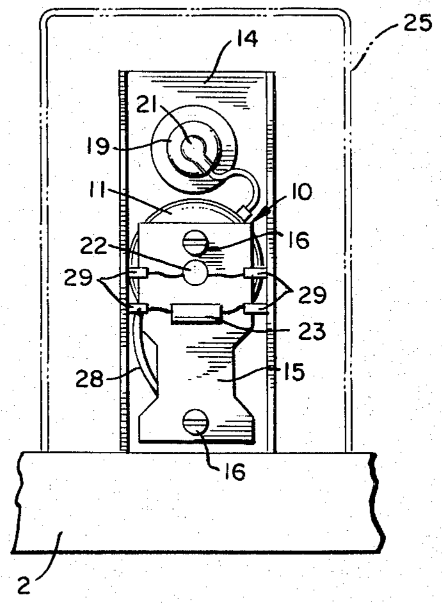
FIG. 2 is a rear view of the assembly of FIG. 1.

A base plate 14, for example of metal, and a terminal board 15 of insulating material are secured to the front and rear faces of the transformer core 11 by a plurality of threaded fasteners such as the screws and nuts 16 and 17. These fasteners can extend through respective bores in the core. The base plate 14 has a socket 18 mounted thereon in which a high voltage rectifier tube 19 is held. A high voltage connector 21 connects the top cap of the rectifier tube 19 to the coil of the transformer. As shown most clearly in FIG. 2, several electrical components such as a capacitor 22 and a resistor 23, which cooperate with the transformer 10 and/or high voltage rectifier 19, are connected between terminals 29 on the insulated terminal board 15.

A plug 20, such as a standard tube-type octal base, is also mounted on the base plate 14. The pins of plug 20 are connected to various portions of the assembly, such as the primary and/or secondary windings of the transformer, components 22, 23, etc. One lead 28 is shown connecting one of the plug pins to a terminal 29 on board 15. As can be seen, the base plate 14 holds the major portion of the high voltage and horizontal deflection system components of the receiver including the transformer, rectifier, and other miscellaneous electrical components.

The assembly 1 is mounted within the high voltage system's protective metal case 25. This case is conventional and therefore it is shown in dot-dash lines. It is held to the chassis 2 by any suitable fasteners, such as screws or rivets, and it has an opening in the back as shown in FIG. 1. An angle bracket 27 is mounted on top of the chassis with a socket 26 held thereon opposite an aperture 30 in the case for mating with the plug 20 of the assembly which extends through the aperture. A number of wires (not shown) are connected to the socket 26 to electrically connect its terminals to the various circuits of the system.

As can be seen in FIG. 1, the assembly can be wired as a separate unit and connected to the receiver by putting it through the rear of the case 25. Moving the assembly 1 in the direction shown by the arrow within the case 25 connects the plug 20 to the socket 26. This electrically connects the transformer assembly to the other circuits (not shown) wired in the chassis and also holds it mechanically. As seen in FIG. 1 the bottom of base plate 14 rests on top of chassis 2 to provide additional mechanical support. Conversely, pulling the transformer assembly in the direction opposite from the arrow, rearwardly in the case, disconnects the plug and socket 20, 26 and permits the assembly to be removed through the rear of the case. Thus, it can be seen that the assembly can be either constructed separately from the rest of the receiver during original manufacture and then assembled thereto and also can be removed quite easily by the serviceman for repair.

Figures 3, 4:
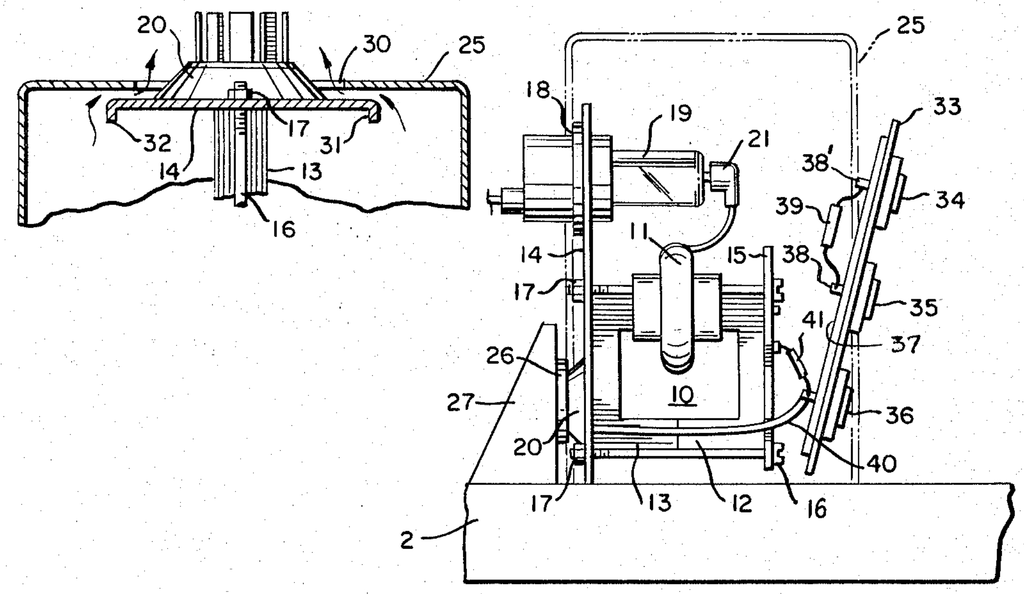
FIG. 3 is a top view, partly in cross-section, of the assembly connector plug and housing in which the assembly is located.
FIG. 4 is a side-elevational view of another embodiment of the invention, including a metallic cover plate for use as a heat sink.

FIG. 3 shows the relationship between the assembly plug 20 and the protective casing 25. Case 25 has an aperture 30 through which the tapered conical bottom portion of the plug 20 partially protrudes when it is mated with socket 26. When the plug and socket are mated, the base plate is spaced from the rear wall of case 25. The edge of the base plate 14 on which plug 20 is mounted, considering that the plate 14 is generally rectangular, has edges 31 and 32 bent back from aperture 30, as shown. This minimizes undesired electromagnetic radiations from the transformer, which occur when sharp edges are present. The plug mounting arrangement of FIG. 3 permits the heat produced during receiver operation to go through the space between the aperture of the case and the edges of the base plate, as indicated by the arrow lines of FIG. 3. Thus, the assembly is quite efficiently cooled.

FIG. 4 shows another embodiment of the invention in which similar reference numerals are used where applicable. In FIG. 4 a cover plate 33, preferably of metal, is provided which has mounted thereon several transistors, such as transistors 34, 35, and 36. One or several of these transistors cooperate with the transformer assembly. The cover plate 33 is secured to the rear of the protective casing 25 by any suitable fasteners, such as screws (not shown) which are removable therefrom. As should be apparent, plate 33 and the entire casing 25 serve as a heat sink for the transistors.

A circuit board 37 of insulating material is mounted on the inner face of the cover plate 33. A plurality of electrical terminals 38 and 38' are mounted on circuit board 37 for connecting electronic components 39 thereto. Several lead wires 40 and 41 are illustratively shown connected from the terminals 38 and 38' of board 37 to the plug 20 and to terminal 29 on the board 15 respectively.

Thus, it can be seen that the transformer assembly is arranged within the protective case 25 and the plug 20 is connected to the socket 26. The entire assembly, including the transistors and the two circuit boards 15 and 37 can be removed together with the assembly by removing the fasteners from plate 33 and pulling out the plug from the socket.

What is claimed is:

1. In an assembly for components of the deflection and high voltage systems of a television receiver having a chassis the sub-assembly comprising a transformer assembly including a transformer having a core and a winding thereon, a base plate mounted on said transformer, means for holding a rectifier means mounted on said base plate, an insulated terminal board having at least one electrical terminal thereon also mounted on said transformer, first connector means mounted on said base plate, means electrically connecting the electrical terminal on said insulated terminal board to said first connector means, second connector means mounted on the receiver chassis for receiving said first connector means in a detachable relationship, said first and second connector means mechanically holding said sub-assembly to the chassis while also being electrically connected to each other.

2. The sub-assembly of claim 1 wherein said base plate and said insulated board are mounted on opposite sides of the transformer.

3. The assembly of claim 1 further comprising a protective housing mounted on said chassis, said housing formed with an opening to accommodate entry and removal of the sub-assembly from within the housing, said housing also formed with an aperture with which said first connector means is aligned when the sub-assembly is located within the housing, the second electrical connector means also being mounted on said chassis aligned with said aperture, interconnection of the first and second electrical connector means holding said assembly within said housing.

4. The sub-assembly of claim 3 wherein one of said electrical connector means has a portion which protrudes through the housing aperture, said portion being of smaller size than said aperture, and means on said base plate to aid the flow of air through said aperture.

5. The sub-assembly of claim 3 further comprising a metal cover plate for said housing opening; a heat producing circuit element means mounted on said cover plate, and means electrically connecting said circuit element means to said transformer assembly, said cover plate and housing serving as a heat sink when the cover plate is fastened to the housing, said cover plate being removable from the chassis when the sub-assembly is detached therefrom.

6. The sub-assembly of claim 5 wherein said heat producing circuit element means is a power transistor which electrically cooperates with the transformer assembly.

7. The sub-assembly of claim 6 wherein one of said electrical connector means has a portion which protrudes through the housing aperture, said portion being of smaller size than said aperture, and means on said base plate to aid the flow of air through said aperture.

8. The sub-assembly of claim 3 wherein said means for holding said rectifier means includes at least one electrical terminal, said terminal located on the side of the base plate remote from the housing opening.

9. The sub-assembly of claim 8 wherein said rectifier means is mounted generally perpendicular to said base plate.

References Cited

UNITED STATES PATENTS

| | | | |
|---|---|---|---|
| 2,514,246 | 7/1960 | Knox | 325—356 XR |
| 2,639,319 | 5/1953 | Torsch | 236—210 XR |
| 2,922,081 | 1/1960 | Dubin | 317—101 XR |

ROBERT K. SCHAEFER, *Primary Examiner.*

M. GINSBURG, *Assistant Examiner.*